United States Patent
Kuenzner

(10) Patent No.: US 9,527,446 B2
(45) Date of Patent: Dec. 27, 2016

(54) METHOD FOR ALIGNING AT LEAST ONE REAR-VIEW MIRROR OF A MOTOR VEHICLE

(71) Applicant: Bayerische Motoren Werke Aktiengesellschaft, Munich (DE)

(72) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/678,209

(22) Filed: Apr. 3, 2015

(65) Prior Publication Data

US 2015/0210218 A1 Jul. 30, 2015

Related U.S. Application Data

(63) Continuation of application No. PCT/EP2013/070396, filed on Oct. 1, 2013.

(30) Foreign Application Priority Data

Oct. 4, 2012 (DE) .................. 10 2012 218 114

(51) Int. Cl.
*B60R 1/08* (2006.01)
*G06F 3/01* (2006.01)
(Continued)

(52) U.S. Cl.
CPC . *B60R 1/08* (2013.01); *B60R 1/06* (2013.01); *B60R 1/07* (2013.01); *G02B 27/01* (2013.01);
(Continued)

(58) Field of Classification Search
CPC ............... B60R 1/08; B60R 1/06; B60R 1/07;
G02D 27/01; G06K 9/00597; G06K 9/00845; G06K 9/00832; G06F 3/013; G06F 3/012
See application file for complete search history.

(56) References Cited

U.S. PATENT DOCUMENTS 6,397,137 B1 * 5/2002 Alpert ................ B60R 1/07
351/209
8,285,457 B1 * 10/2012 Askew ................ B60R 1/0612
359/841
(Continued)

FOREIGN PATENT DOCUMENTS

DE          101 31 720 A1    1/2003
DE     10 2004 011 714 A1    9/2005
(Continued)

OTHER PUBLICATIONS

International Search Report (PCT/ISA/210) dated Dec. 11, 2013, with English translation (four (4) pages).
(Continued)

*Primary Examiner* — Abby Lin
(74) *Attorney, Agent, or Firm* — Crowell & Moring LLP

(57) ABSTRACT

A method is provided for aligning at least one rear view mirror and/or another optical component of a motor vehicle. The current eye position of the driver is determined by an interior sensor system upon actuation of a control element. The at least one rear view mirror is automatically aligned as a function of the determined current eye position of the driver. An indication is output when the eye position of the driver cannot be determined.

15 Claims, 1 Drawing Sheet

(51) Int. Cl.
    *G02B 27/01*     (2006.01)
    *G06K 9/00*     (2006.01)
    *B60R 1/06*     (2006.01)
    *B60R 1/07*     (2006.01)

(52) U.S. Cl.
    CPC ........... *G06F 3/013* (2013.01); *G06K 9/00597* (2013.01); *G06K 9/00845* (2013.01)

(56) References Cited

U.S. PATENT DOCUMENTS

| | | |
|---|---|---|
| 2004/0178894 A1 | 9/2004 | Janssen |
| 2009/0022368 A1* | 1/2009 | Matsuoka ............. B60K 35/00 382/103 |
| 2010/0007961 A1* | 1/2010 | Kukita ................... B60R 1/007 359/605 |
| 2010/0265600 A1 | 10/2010 | Okuda et al. |
| 2011/0317015 A1* | 12/2011 | Seto ......................... B60R 1/00 348/148 |
| 2012/0154441 A1* | 6/2012 | Kim .................. G06K 9/00832 345/633 |
| 2012/0200490 A1* | 8/2012 | Inada .................... A61B 3/113 345/156 |
| 2013/0138392 A1 | 5/2013 | Kumon et al. |

FOREIGN PATENT DOCUMENTS

| | | |
|---|---|---|
| DE | 10 2005 019 154 A1 | 10/2006 |
| DE | 10 2010 023 160 A1 | 12/2011 |
| EP | 2 000 889 A2 | 12/2008 |
| WO | WO 2012/023480 A1 | 2/2012 |

OTHER PUBLICATIONS

German Search Report dated Jul. 29, 2013, with partial English translation (eleven (11) pages).

Chinese Office Action issued in counterpart Chinese Application No. 201380051964.2 dated Oct. 26, 2016 with English translation (10 pages).

* cited by examiner

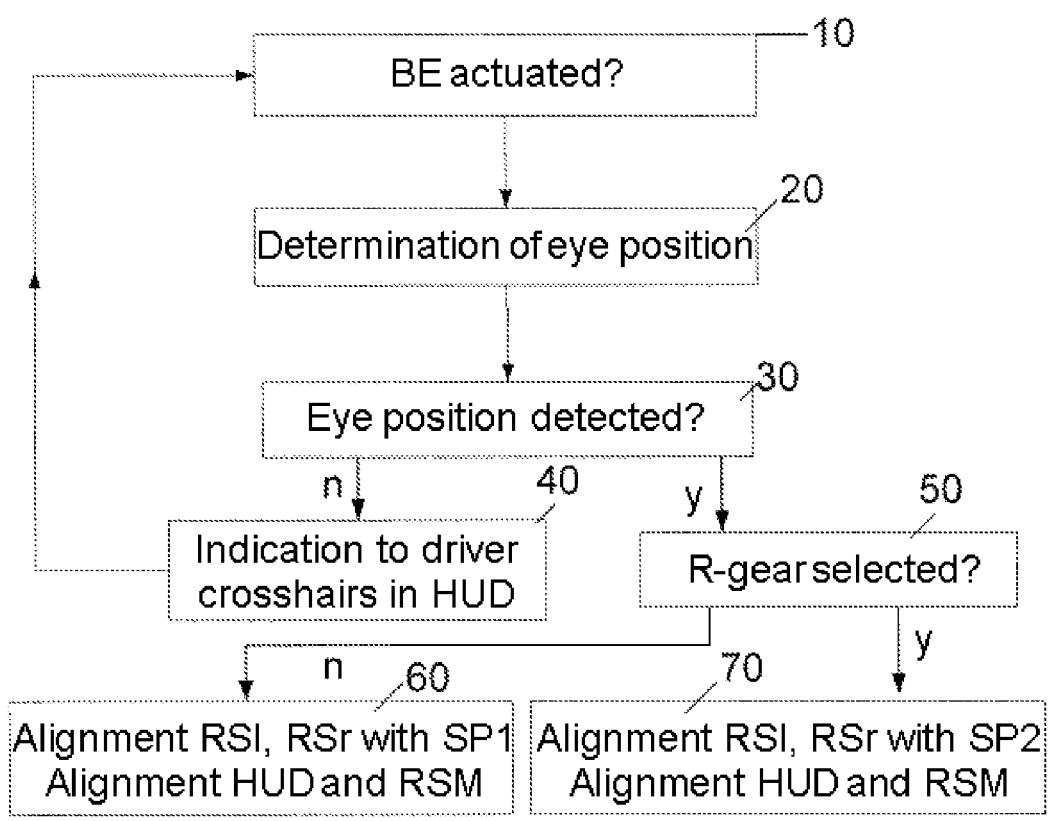

METHOD FOR ALIGNING AT LEAST ONE REAR-VIEW MIRROR OF A MOTOR VEHICLE

CROSS REFERENCE TO RELATED APPLICATIONS

This application is a continuation of PCT International Application No. PCT/EP2013/070396, filed Oct. 1, 2013, which claims priority under 35 U.S.C. §119 from German Patent Application No. 10 2012 218 114.8, filed Oct. 4, 2012, the entire disclosures of which are herein expressly incorporated by reference.

BACKGROUND AND SUMMARY OF THE INVENTION

The invention relates to a method for aligning at least one rear view mirror and/or another optical component of a motor vehicle.

At present, in most vehicles the rear view mirror or other optical devices have to be set manually by the driver. This requires a certain complexity of operator control until the mirror and/or also a so-called head-up display are set optimally for the driver. Furthermore, in most vehicles it is also possible to set the steering wheel by manual adjustment in accordance with the driver's wishes. Since these settings can at least partially also be undertaken while driving, there is a risk of distraction from events on the road owing to the complexity of the operator control.

Furthermore, there are already known at least in the patent literature mirror setting systems by which the mirrors or other optical components are set automatically in a continuous fashion or upon demand by the driver. Thus, DE 10 2005 019 154 A1 discloses a device for setting at least one vehicle component, such as a mirror, as a function of an imaging sensor system in a motor vehicle. The device begins, suppresses or stops the setting as a function of at least one gesture, detected by the imaging sensor system, of a vehicle occupant. Furthermore, the imaging sensor system is used, inter alia, to determine the head position, the eye position and the viewing direction of the occupant and, upon activation of the setting system, the relevant component(s) is/are automatically set as a function of the data, determined by means of the imaging sensor system, and the variables derived therefrom.

Furthermore, DE 10 2004 011 714 A1 discloses a method for aligning at least one rear view mirror on a motor vehicle, an interior sensor system being used to determine the head position and eye position of the driver and to set the rear view mirror as a function of the detected head position and eye position automatically. The automatic alignment can be performed, for example, after switching on an ignition and/or operating a switch in the motor vehicle.

A problem with such automatic or automated mirror setting systems which are based on the determined head position and/or eye position is that owing to a defective sensor system, or because the driver is moving or has assumed a poor position, the information relevant to the automatic alignment of the optical components cannot be determined. The system would then either not undertake an alignment, or undertake a defective alignment, of the optical components.

It is an object of the invention to provide a method for automatically aligning at least one rear view mirror and/or another optical component which is improved with regard to the above known problem.

This and other objects are achieved by a method for aligning at least one rear view mirror and/or another optical component of a motor vehicle, the current eye position of the driver being determined by an interior sensor system upon actuation of a control element, and the at least one rear view mirror being automatically aligned as a function of the determined current eye position of the driver, wherein an indication is output when the eye position of the driver cannot be determined.

In principle, the invention proceeds from a method for aligning at least one rear view mirror and/or another optical component of a motor vehicle. The current eye position of the driver is determined by an interior sensor system upon actuation of a control element provided therefor. The at least one rear view mirror and/or the other optical component is automatically aligned as a function of the determined eye position of the driver. In addition to the rear view mirrors installed in the vehicle, the optical device can also be a head-up display arranged in the region of the windshield. In addition, further adjustable components such as the steering wheel can also be appropriately set. The interior sensor system can, for example, be an imaging sensor system, in particular a view detection system, by which the eyes can be detected directly and the position of the eyes can be determined. However, it is also possible to provide any other sensor system by which the position of the eyes of the driver can be directly determined or can be indirectly determined by calculation from other available data.

It is provided according to the invention that the method is configured such that an indication is output when the eye position of the driver cannot be determined. This indication can, for example, be output in the form of an optical, acoustic and/or haptic signal.

Since it may be the case that the driver assumes a position to which he wishes to set the optical component just a short time after the activation of the function, when the eye position of the driver cannot be determined the indication is advantageously not output until after a prescribed time interval of, for example, 5 seconds.

In its simplest form, the indication can be configured in such a way that the driver is informed that the eye position cannot be determined. Since, as a rule, it is possible in principle to proceed from an interior sensor system that is functioning properly, or that it is even possible to detect proper functioning, in an advantageous refinement of the invention the indication can also be configured such that along with the indication the driver receives a request to position his eyes to the front. In order to be able to facilitate the positioning for the driver, and thus to facilitate the detection of the eye position for the interior sensor system, a positioning display for displaying the correct eye alignment in a head-up display or combination instrument can be activated by either actuating the control element or, at the latest with the output of the indication. This can be, for example, a cross-hair display which is displayed centrally in the head-up display. A particularly precise and quick setting can be facilitated thereby.

After output of the indication that it is impossible to determine eye position, a renewed determination is advantageously automatically undertaken of the current eye position and, subsequently, the at least one rear view mirror is aligned as a function of the current eye position then determined. Ideally, the eye position can be determined anew and the mirror can also be subsequently set only after a prescribed time interval after output of the indication, since the driver may need a certain amount of time until he has moved into the appropriate position.

As an alternative to automatically restarting the method, the method according to the invention can also be developed such that the alignment procedure is terminated, as it were, when the eye position of the driver cannot be determined and with the output of the indication. A further attempt to detect the eye position and the corresponding setting of the at least one rear view mirror would therefore not take place until the driver once again actuates the appropriate control element or a control element specifically provided for said case.

In principle, the method can also be configured in such a way that the entire method for aligning, which is started by actuating the appropriate control element, is active or is carried out for as long as the driver actuates the control element, since it is thereby possible to assume with a high probability that the driver is aware of the alignment procedure of the at least one mirror which has just become active, and adopts an appropriate seated position and/or eye position with which the at least one mirror is to be aligned.

Particularly with regard to the alignment of the (outer) mirrors, it can make sense to provide a plurality of mirror positions which can be set when activating the alignment. The various mirror positions are defined by virtue of the fact that, given appropriate alignment of the mirror, they enable the driver to view a specific area outside or also inside the vehicle.

The selection of the mirror position with which the goal is to align the corresponding mirrors can be performed in various ways. In the simplest configuration, the selection of the mirror position can be performed by a manual selection of the driver (for example, by vocalizing the selection or by appropriate setting in a menu). Alternatively, in an advantageous development of the invention, the mirror position to be aligned can also be brought about automatically as a function of prescribed current operating parameters and/or setting parameters of the vehicle. In particular, it is, for example, sensible to evaluate the currently selected transmission gear, that is to say to select the mirror position to be aligned as a function of the currently selected transmission gear. If, for example, the reverse gear is currently selected, and the speed is zero or very low, it can be assumed that the driver would like to park and, when looking into the rear view mirror, would like to have a view downward onto the street and/or onto a possible delimitation of a parking space or onto other obstacles, and thus to set a "parking" rear view mirror position. However, if a forward gear is selected (and the speed is also, if appropriate, greater than zero), it may be assumed that the driver would like to observe the traffic behind and to the side when looking into the rear view mirror, and therefore intends to undertake an appropriate "normal" rear view mirror setting.

It can advantageously further be provided that the driver is able, in advance, to undertake in an appropriate menu a selection of the optical components that are to be aligned appropriately such as the rear view mirror or the head-up display and other vehicle components to be set, such as the steering wheel. If the alignment is then started by actuating the control element, all the components that the driver has selected are set. This makes sense, above all, because, in particular, every driver feels a different steering wheel position to be convenient for him, and for this reason automatic positioning of the steering wheel is not necessarily sensible in every case.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a simplified flowchart for aligning all rear view mirrors arranged in the vehicle and for aligning a head-up display.

DETAILED DESCRIPTION OF THE DRAWING

The flowchart in FIG. 1 can be implemented by software, for example implemented in an appropriate controller. The method for aligning the above-identified components starts in step 10 as soon as the driver has actuated the control element BE provided therefor. It is to be mentioned here that the control element BE can, for example, be arranged in the driver's door and can replace the previous control elements for manual setting of the outer rear view mirrors. If an actuation of the control element BE is detected, use is made in the next step 20 of an interior sensor system provided therefor, which is configured as a view detection system, in order to determine the current eye position of the driver, or an attempt is made to determine the current eye position.

If no eye position of the driver can be determined within a prescribed time interval (=n branch) because the driver has, for example, angled his view strongly downward, an appropriate indication is output to the driver in step 40. This indication can, for example, be performed acoustically, and prompt the driver to direct his view forward. At the same time as the acoustic indication is output, a cross-hair display is faded into the head-up display HUD, and the driver is thereby offered a point of orientation to which he can direct his view. Subsequently, the setting procedure is, as it were, stopped, and there is a jump back to step 10 with a wait until the driver renews his actuation of the appropriate control element. Only when the control element BE is actuated anew, are the determination of eye position and the automatic alignment procedure restarted.

However, if the eye position can be detected and if an eye position has therefore been detected (=y branch), a check is made in the next step 50 as to whether reverse gear R has been selected. If this is not the case, it is assumed that the driver wishes to set the left-hand and right-hand external mirrors RSl and RSr in such a way that he has an optimum view onto the traffic at the rear. Thereafter, in step 60, the left-hand and right-hand external mirrors RSl and RSr are aligned as a function of the current eye position with a prescribed first mirror position SP1 which enables an optimum view onto the rear traffic. In addition to the two mirrors RSl and RSr, the internal mirror RSM and the head-up display are also further optimally aligned as a function of the determined eye position of the driver.

If, however, it is detected in step 50 that reverse gear R is currently selected, it is assumed that the driver is now in a parking situation and wants to set the left-hand and right-hand external mirrors RSl and RSr in such a way that he has an optimum view onto the curb or other boundaries near the ground. Thereafter, in step 70, the left-hand and right-hand external mirror RSl and RSr are aligned as a function of the current eye position with a prescribed second mirror position SP2 which enables a view onto the appropriate area. In addition to the two mirrors RSl and RSr, in a way similar to step 60, the internal mirror RSM and the head-up display are also aligned as a function of the determined eye position of the driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for aligning at least one rear view mirror or other optical component of a motor vehicle, the method comprising the acts of:
    determining, via an interior sensor system, a current eye position of the driver upon actuation of a control element provided to initiate alignment of the at least one rear view mirror or other optical component;
    when the current eye position of the driver is determined following the actuation of the control element to initiate the alignment, automatically aligning the at least one rear view mirror or other optical component as a function of the determined eye position of the driver; and
    when the current eye position cannot be determined following the actuation of the control element to initiate the alignment, outputting to the driver an indication that the current eye position of the driver cannot be determined.

2. The method according to claim 1, wherein the outputting of the indication is carried out after a prescribed time interval following the actuation of the control element to initiate the alignment when the current eye position of the driver cannot be determined.

3. The method according to claim 2, wherein the indication that is output comprises a request to the driver to position the eyes of the driver toward a front of the vehicle.

4. The method according to claim 1, wherein the indication that is output comprises a request to the driver to position the eyes of the driver toward a front of the vehicle.

5. The method according to claim 1, further comprising the act of:
    activating a positioning display in a head-up display of the vehicle no later than with the outputting of the indication.

6. The method according to claim 4, further comprising the act of:
    activating a positioning display in a head-up display of the vehicle no later than with the outputting of the indication.

7. The method according to claim 1, further comprising the act of:
    after outputting the indication, automatically again determining the current eye position of the driver and automatically aligning the at least one rear view mirror or other optical component if the current eye position is determined as a function of the determined current eye position.

8. The method according to claim 6, further comprising the act of:
    after outputting the indication, automatically again determining the current eye position of the driver and automatically aligning the at least one rear view mirror or other optical component if the current eye position is determined as a function of the determined current eye position.

9. The method according to claim 1, further comprising the act of:
    after outputting the indication, only again determining the current eye position and aligning the at least one rear view mirror or other optical component after receiving a control element actuation request.

10. The method according to claim 6, further comprising the act of:
    after outputting the indication, only again determining the current eye position and aligning the at least one rear view mirror or other optical component after receiving a control element actuation request.

11. The method according to claim 1, wherein at least two relative mirror positions are provided, and further wherein the act of automatically aligning is carried out in accordance with a selected one of the at least two mirror positions.

12. The method according to claim 11, wherein a selection of one of the at least two relative mirror positions is carried out as a function of prescribed operating parameters or setting parameters of the vehicle.

13. The method according to claim 12, wherein the selected one of the at least two relative mirror positions is selected as a function of a currently selected transmission gear of the vehicle.

14. The method according to claim 11, wherein the selected one of the at least two relative mirror positions is selected as a function of a currently selected transmission gear of the vehicle.

15. The method according to claim 11, wherein a selection of one of the at least two relative mirror positions is carried out as a function of prescribed operating parameters and setting parameters of the vehicle.

* * * * *